United States Patent [19]

Goswami et al.

[11] Patent Number: 5,288,822
[45] Date of Patent: Feb. 22, 1994

[54] LIQUID CRYSTALLINE EPOXY RESIN AS ADDITIVE FOR POLYKETONE POLYMERS

[75] Inventors: Jagadish C. Goswami, New City; Ki-Soo Kim, Katonah, both of N.Y.

[73] Assignee: Akzo nv, Arnhem, Netherlands

[21] Appl. No.: 820,186

[22] Filed: Jan. 14, 1992

[51] Int. Cl.⁵ .................. C08G 6/02; C08F 283/00
[52] U.S. Cl. ........................ 525/539; 525/471; 525/522; 525/931; 528/88; 528/126; 528/127
[58] Field of Search .......... 525/539, 522, 471, 931; 528/88, 126, 127

[56] References Cited

U.S. PATENT DOCUMENTS

| | | | |
|---|---|---|---|
| 4,761,448 | 8/1988 | Kluttz et al. | 524/612 |
| 4,764,581 | 8/1988 | Müller et al. | 528/103 |
| 4,795,774 | 1/1989 | Kluttz | 524/258 |
| 4,808,678 | 2/1989 | Lutz | 525/529 |
| 4,954,548 | 9/1990 | Klingensmith | 524/258 |
| 4,960,808 | 10/1990 | Schmitter | 524/222 |
| 5,039,763 | 8/1991 | Drent | 525/539 |

Primary Examiner—Melvyn I. Marquis
Assistant Examiner—Randy Gularowski
Attorney, Agent, or Firm—Richard P. Fennelly; Louis A. Morris

[57] ABSTRACT

Polyketone polymers can be stabilized and rendered more processable by the inclusion of a liquid crystalline diglycidyl compound, e.g., the diglycidyl ether of a 1,4-bis(p-hydroxybenzoyloxy) cyclohydrocarbon.

3 Claims, No Drawings

LIQUID CRYSTALLINE EPOXY RESIN AS ADDITIVE FOR POLYKETONE POLYMERS

BACKGROUND OF THE INVENTION

Much has appeared recently in the patent literature in regard to "polyketone polymers", which term is to be understood as relating to linear alternating copolymers of carbon monoxide with at least one olefin such as ethylene, propylene or the like. The name "polyolefin ketone" has also been used to refer to these polymers. These polymers have the general structure —CO—(A)— where A is the moiety of ethylenically unsaturated hydrocarbon polymerized through the ethylenic linkage. Various disclosures exist in the art in regard to the stabilization, for example, of such materials including the following: U.S. Pat. Nos. 4,761,448, 4,795,774, 4,808,678, 4,954,548, and 4,960,808; and European Patent Publication Nos. 288,124 and 326,223 to name just a few.

European patent publication No. 310,171 describes the melt Spinn make fibers.

U.S. Statutory Invention Registration No. 732 shows blends of a polyketone polymer and a polyglycidyl ether of a poly(hydroxyphenylalkane) oligomer with the oligomer acting as a melt processing aid. This oligomer is not believed to be liquid crystalline.

SUMMARY OF THE INVENTION

The present invention relates to a polyketone polymer which contains a liquid crystalline diglycidyl compound as an additive to stabilize and/or enhance the processability of the polymer.

DETAILED DESCRIPTION OF THE INVENTION

The term "polyketone polymer" is meant to encompass the aforementioned linear alternating copolymers of carbon monoxide with one or more olefins. A preferred polymer of this type is a terpolymer of carbon monoxide, ethylene and propylene such as exemplified in European Patent Publication No. 310,171.

The term "liquid crystalline diglycidyl compound" is meant to cover compounds of the general structure G-L-G where G represents a glycidyl group and L represents a liquid crystalline or mesogenic structure. U.S. Pat. No. 4,764,581 which shows liquid crystalline diglycidyl compounds of optionally ring-substituted 4-hydroxyphenyl 4-hydroxybenzoates, which are taught as useful additives for epoxy resins, is one example which might be selected. A preferred type of diglycidyl compound, however, is described in copending U.S. Ser. No. 820,187, filed on even date herewith, in which the diglycidyl ether of a 1,4-bis(p-hydroxybenzoyloxy) cyclohydrocarbon is described. These compounds have the structure

where Ar represents phenylene (e.g., bonded in their para positions) and B represents a cyclohydrocarbylene bridging group such as cyclohexylene or phenylene.

The amount of the liquid crystalline diglycidyl compound to be added to the predominant amount of polyketone polymer can range from about 1% to about 20%, by weight of the polyketone polymer.

The present invention is further illustrated by the Examples which follow.

EXAMPLE 1

The components listed below were selected for blending:

|  | Weight Percent |
| --- | --- |
| Polyketone polymer* | 96% |
| Liquid crystalline epoxy** | 3% |
| 4,4'-thio-bis-(t-butyl meta-cresol) | 1% |

*a terpolymer formed from 48.2% carbon monoxide, 41% ethylene, and 10.8% propylene.
**the diglycidyl ether of 1,4-bis(p-hydroxybenzoyloxy)cyclohexane, cis form.

A single screw extruder with a gear pump to control polymer output was used. The extruder was stabilized at 210° C. with polyethylene flowing at a constant rate and with the spinnerette attached. The polyethylene was then replaced with the previously described mixture of polyketone polymer and other additives. The polymer was allowed to flow through the extruder until all of the polyethylene had been replaced with the polyketone polymer. Spinning of fibers was very successful with fibers of good quality being collected at a rate of about 75 meters/minute. No crosslinking of the fibers observed.

COMPARATIVE EXAMPLE 2

Example 1 was repeated using a standard epoxy novolac resin at a temperature of 240° C. and with the spinnerette being attached after the polyketone-containing blend had replaced the polyethylene in the extruder. The blend, which comprised 90% by weight of polyketone terpolymer, 5% of epoxy novolac resin (DEN 444 from Dow Chemical, and 5% of IRGANOX 1035 from Ciba Geigy), could not be processed. The material which was extruded began to show severe melt fracture which was an indication of heavy crosslinking. Attempted adjustments in the revolutions per minute of the spinnerette and the temperature of extrusion did not alleviate the problem. There was a rapid pressure buildup which reached 350 bars and the experiment was aborted to avoid damaging the equipment.

EXAMPLE 3

This Example illustrates fiber formation from a blend of 96% of the polyketone terpolymer described in Examples 1 and 2, 3% of the liquid crystalline epoxy described in Example 1, and 1% of 4,4'-thio-bis-(t-butyl-meta-cresol) which is available under the trademark SANTOWHITE from Monsanto Industrial Chemicals Co.

The spinning machine used was an 18 mm single screw extruder (CDS NR 24) with a spinning plate containing ten holes of 350 micron diameter:

| Extruder - zone 1 | 200° C. |
| --- | --- |
| zone 2 | 205° C. |
| zone 3 | 210° C. |
| Extruder rotation | 50 rpm |
| Extruder pressure | 100 bar |
| Spinning pump | 0.6 cm³/rev |
| Pump | 10 rpm |
| Spinnerette pressure | 15 bar |
| Spinning temperature | 207° C. |

-continued

| | Winding speed | 88 m/min |
|---|---|---|

The spinning performance for the blend was good. Summarized below are the drawing conditions and resulting yarn properties:

| Run. No. | $V_0$ (m/min) | $V_1$ (m/min) | $V_2$ (m/min) | $DR_1$ | $DR_T$ |
|---|---|---|---|---|---|
| 1 | 3.0 | 12.0 | 26.0 | 4.0 | 8.67 |
| 2 | 3.0 | 12.0 | 26.0 | 4.0 | 8.67 |
| 3 | 3.0 | 12.0 | 28.0 | 4.0 | 9.33* |
| 4 | 3.0 | 15.0 | 29.0 | 5.0 | 9.67** |

DR = draw ratio; $DR_1 = V_1/V_0$; $DR_T = V_1/V_0 + V_2/V_1$.
*filament broke on hot plate.
**at DR = 10 there was breakage of yarn on hot plate.

| Run No. | $T_{pin}$ (°C.) | $T_{plate}$ (°C.) | $\alpha^{(1)}$ (mN/tex) | $\epsilon^{(2)}$ (%) | $E_c^{(3)}$ (N/tex) |
|---|---|---|---|---|---|
| 1 | 84 | 171 | 467 | 8.0 | 4.4 |
| 2 | 84 | 181 | 375 | 9.0 | 3.4 |
| 3 | 84 | 181 | 514 | 9.3 | 4.7 |
| 4 | 84 | 185 | 496 | 8.3 | 5.0 |

$^{(1)}\alpha$ = fiber tenacity.
$^{(2)}\epsilon$ = fiber elongation.
$^{(3)}E_c$ = fiber modulus.

The foregoing Examples are intended to illustrate certain embodiments of the present invention and, for that reason, should not be construed in a limiting sense. The scope of protection sought is set forth in the claims which follow.

We claim:

1. A polyketone polymer composition which comprises a predominant amount of a polyketone polymer and a liquid crystalline diglycidyl compound wherein the compound is the diglycidyl ether of a 1,4-bis(p-hyroxybenzoyloxy) cyclohydrocarbon to stabilized and/or enhance the processability of the polymer.

2. A composition as claimed in claim 1 wherein the cyclohydrocarbon is cyclohexane.

3. A composition as claimed in claim 1 wherein the liquid crystalline diglycidyl compound is present at from about 1% to about 20% by weight of the polyketone polymer.

* * * * *